(12) United States Patent
Goldberg et al.

(10) Patent No.: US 9,521,190 B2
(45) Date of Patent: Dec. 13, 2016

(54) DYNAMIC SESSION TRANSFORMATION

(71) Applicants: Richard Goldberg, Los Gatos, CA (US); Oleg Rombakh, Los Gatos, CA (US); Andrew T. Fausak, San Jose, CA (US)

(72) Inventors: Richard Goldberg, Los Gatos, CA (US); Oleg Rombakh, Los Gatos, CA (US); Andrew T. Fausak, San Jose, CA (US)

(73) Assignee: Dell Products L.P., Round Rock, TX (US)

(*) Notice: Subject to any disclaimer, the term of this patent is extended or adjusted under 35 U.S.C. 154(b) by 236 days.

(21) Appl. No.: 14/220,651

(22) Filed: Mar. 20, 2014

(65) Prior Publication Data

US 2015/0271027 A1    Sep. 24, 2015

(51) Int. Cl.
*G06F 3/048* (2013.01)
*H04L 29/08* (2006.01)
*H04L 29/06* (2006.01)
*G06F 9/44* (2006.01)

(52) U.S. Cl.
CPC ............. *H04L 67/10* (2013.01); *H04L 65/403* (2013.01); *G06F 9/4443* (2013.01); *G06F 9/4445* (2013.01)

(58) Field of Classification Search
CPC ............... H04L 29/06; H04L 29/06027; H04L 65/1016; H04L 67/08; H04L 67/10; H04L 67/14; G06F 3/0346; G06F 3/04842–3/04886; G06F 9/4443–9/4445; G06F 17/3087
See application file for complete search history.

(56) References Cited

U.S. PATENT DOCUMENTS

| | | | | |
|---|---|---|---|---|
| 2008/0313549 | A1* | 12/2008 | Stoyanov | G06F 9/4445 715/749 |
| 2012/0297041 | A1* | 11/2012 | Momchilov | G06F 9/4443 709/223 |
| 2013/0013671 | A1* | 1/2013 | Relan | H04L 67/34 709/203 |
| 2015/0212654 | A1* | 7/2015 | Beckett, Jr. | G06Q 30/0271 705/14.67 |

* cited by examiner

*Primary Examiner* — Claudia Dragoescu
(74) *Attorney, Agent, or Firm* — Baker Botts L.L.P.

(57) ABSTRACT

In particular embodiments, a computing device establishes a remote desktop connection with a remote host, the remote desktop connection including one or more dynamic virtual channels. The computing device receives from one or more sensors an indication that the computing device has been rotated to a new orientation. The computing device sends to the remote host, via one of the dynamic virtual channels, information associated with the new orientation. The computing device receives from the remote host graphical data based at least in part on the information associated with the new orientation and provides for display the graphical data.

20 Claims, 8 Drawing Sheets

DYNAMIC SESSION TRANSFORMATION

TECHNICAL FIELD

This disclosure relates generally to information handling systems and, more particularly, to computing devices having multiple network interface controllers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-8 wherein like numbers are used to indicate like and corresponding parts.

Figure 1:
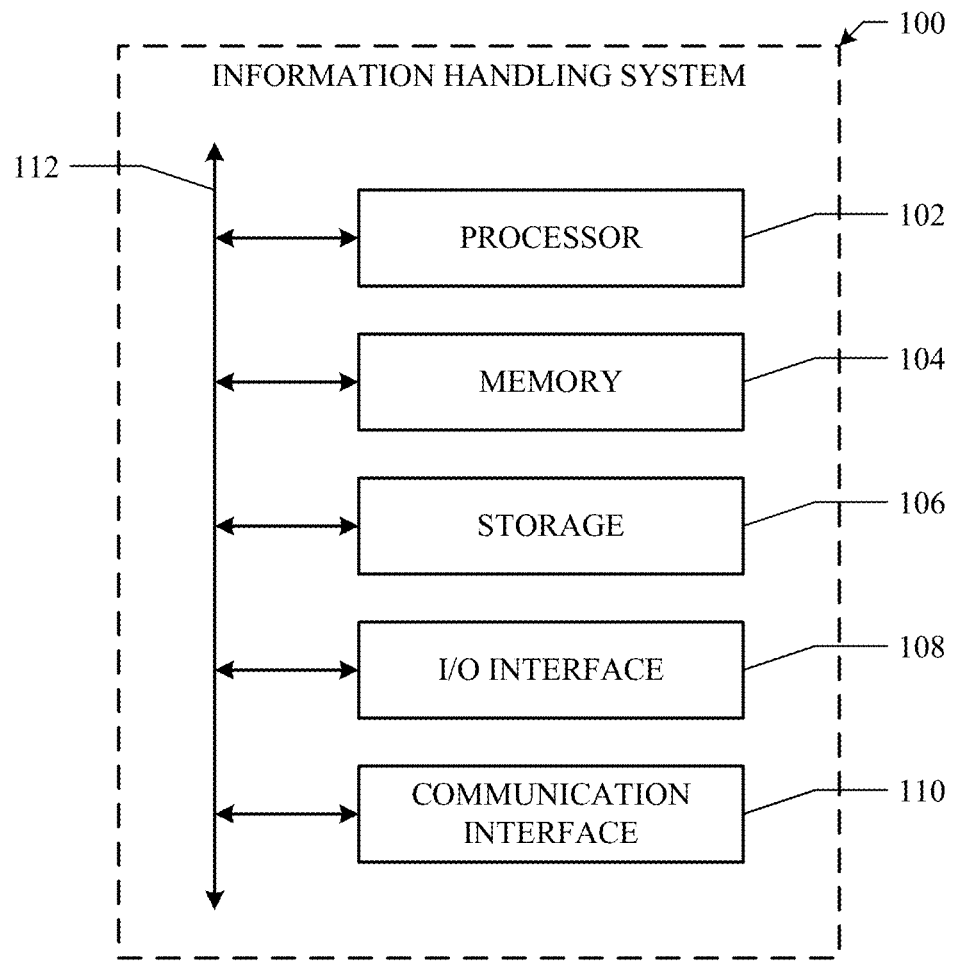
FIG. 1 is a block diagram of selected elements of an embodiment of an information handling system.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
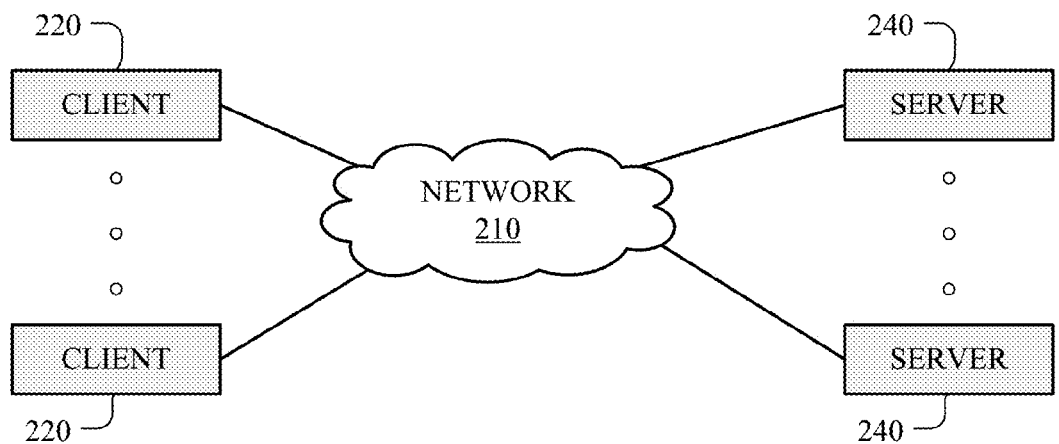
FIG. 2 is an example of a network environment in which an information handling system in accordance with FIG. 1 may operate.

FIG. 2 illustrates an example configuration of networked information handling systems. In particular embodiments, one or more client devices 220 and one or more servers 240 are connected via network 210. A client device 220 may be a desktop computer, a laptop computer, a tablet computer, a thin client, a handheld device, a cell phone, or any suitable information handling system. A client device 220 may communicate with a server 240 via one or more protocols such as Hypertext Transfer Protocol (HTTP), Independent Computing Architecture (ICA) protocol (developed by Citrix Systems, Inc.), Remote Desktop Protocol (RDP) (developed by Microsoft Corporation), or any suitable protocol or combination of protocols. A client device 220 may access resources provided by a server 240 such as data, applications, or devices. A server 240 may be a server computing device, a desktop computer, a laptop computer, or any suitable information handling system. In one embodiment, a server 240 may be a virtual machine, a remote desktop session, or any suitable application or set of applications running on one or more information handling systems.

Figure 3:
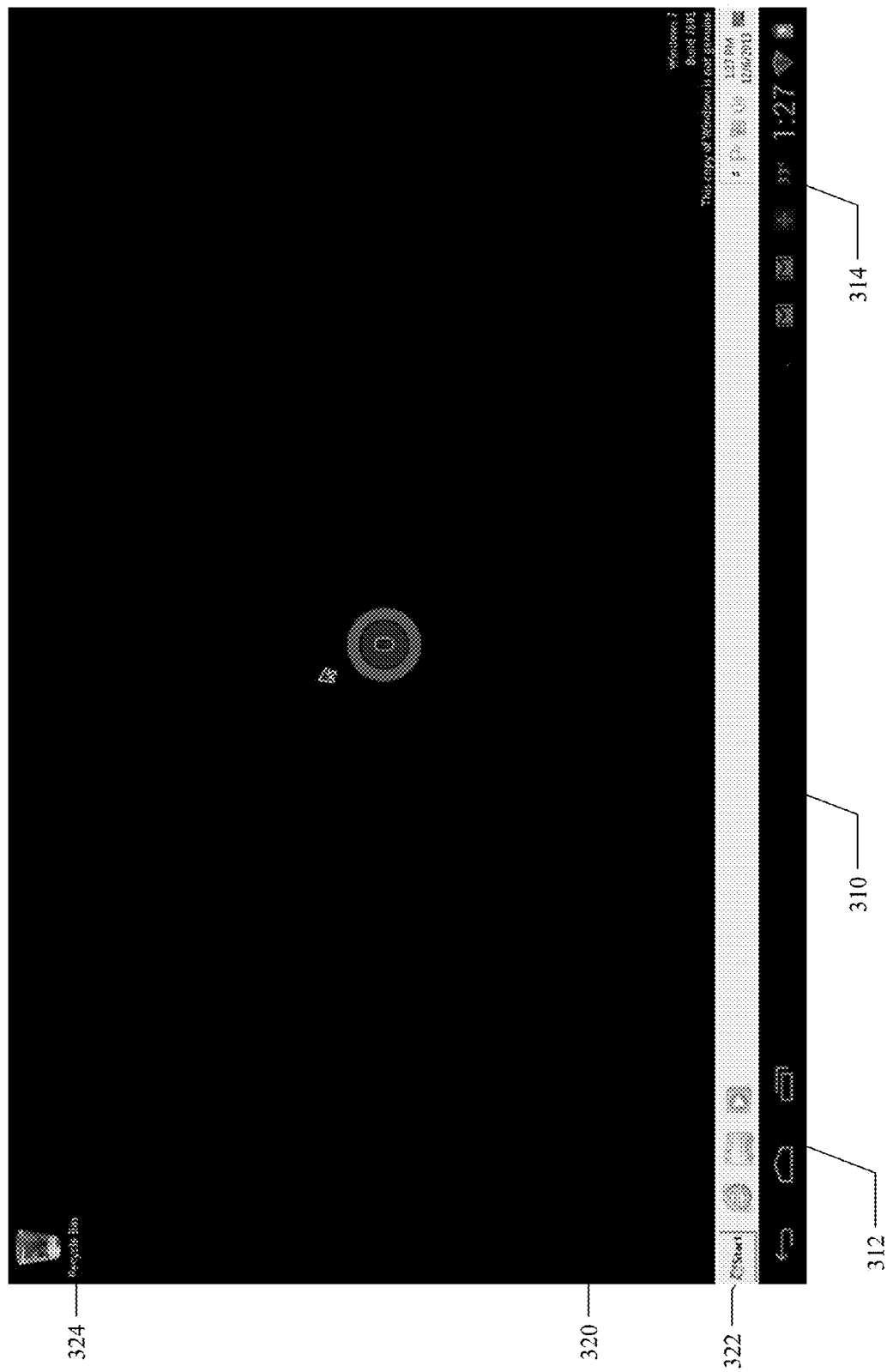
FIGS. 3-8 are examples of graphical data displayed on a mobile client device.

In particular embodiments, a client device 220 may be a mobile client device such as, for example, a mobile phone or a tablet computer. A client device 220 may communicate with one or more servers 240 using, for example, Remote Desktop Protocol ("RDP"), and a client application supporting RDP may run on the client device 220. In particular embodiments, a client device 220 may interact with a remote desktop or remote application hosted by one or more servers 240 using an RDP client application running on client device 220. For example, a user of a mobile phone or tablet computer may interact with a remote desktop or remote application hosted by one or more servers 240 via an interface provided by an RDP client application running on the mobile phone or tablet computer. FIG. 3 illustrates an example embodiment in which an interface 320 provided by an RDP client application running on a mobile client device is displayed on a screen 310 of the mobile client device. The screen 310 displays information, icons, or buttons 312 and 314 that are local to the mobile client device, and which may, for example, be provided by an operating system of the mobile client device (e.g. Apple IOS or Google ANDROID). The information, icons, or buttons 312 and 314 include a 'back' button, a 'home screen' button, a 'new window' button, icons representing that new e-mails have been received, a WIFI connectivity icon, and a battery life icon. The screen 310 also displays RDP client application interface 320 that shows a remote desktop with which the mobile client device is interacting. The remote desktop may be hosted by one or more servers 240 with which the client device is communicating via RDP. The remote desktop in this example is a Microsoft WINDOWS 7 desktop, and the full remote desktop including system taskbar 322 and desktop icons 324 are displayed to the user of the mobile computing device via RDP client application interface 320.

In particular embodiments, a user may rotate a mobile client device (e.g. a mobile phone or tablet computer) while using the mobile client device. For example, a user of a tablet computer may desire, for ease of use, to view content on the tablet computer in a "landscape" format instead of a "portrait" format. The user may simply rotate the mobile client device, and one or more sensors of the mobile client device (e.g., accelerometer, gravitometer, or gyroscope) may notify the operating system of the mobile client device that a rotation has occurred. The operating system may then take necessary steps to display content (e.g. one or more applications or a home screen) in the new orientation. For example, the operating system may notify listeners associated with one or more applications that the screen dimensions of the mobile client device have been updated, and the applications may automatically reorient and resize to display in the new screen dimensions. As another example, if the mobile client device is touch-sensitive, the coordinates of a finger touch may be transformed into a new coordinate space corresponding to the axes of the new orientation by the operating system.

Figure 4:
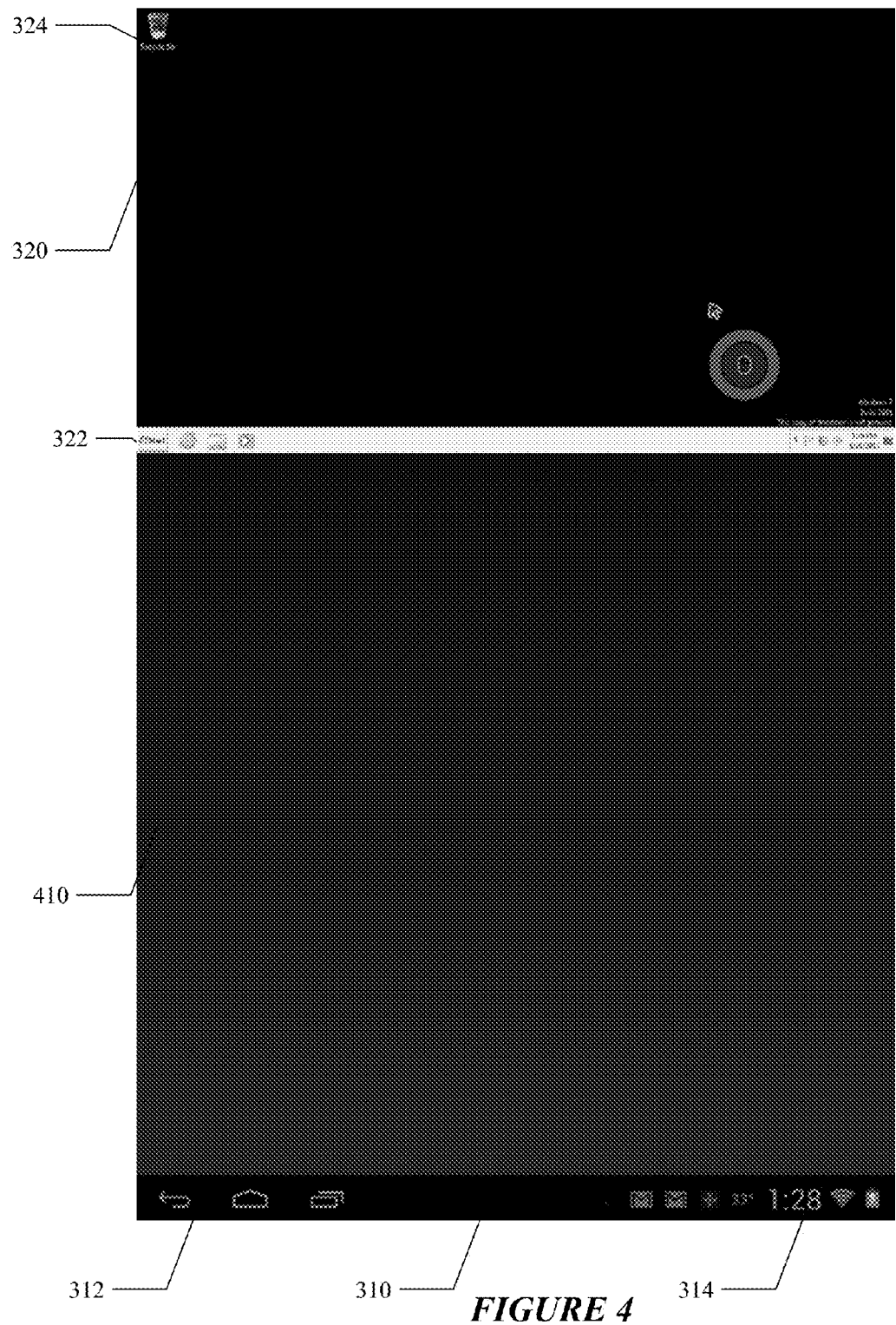
Figure 6:
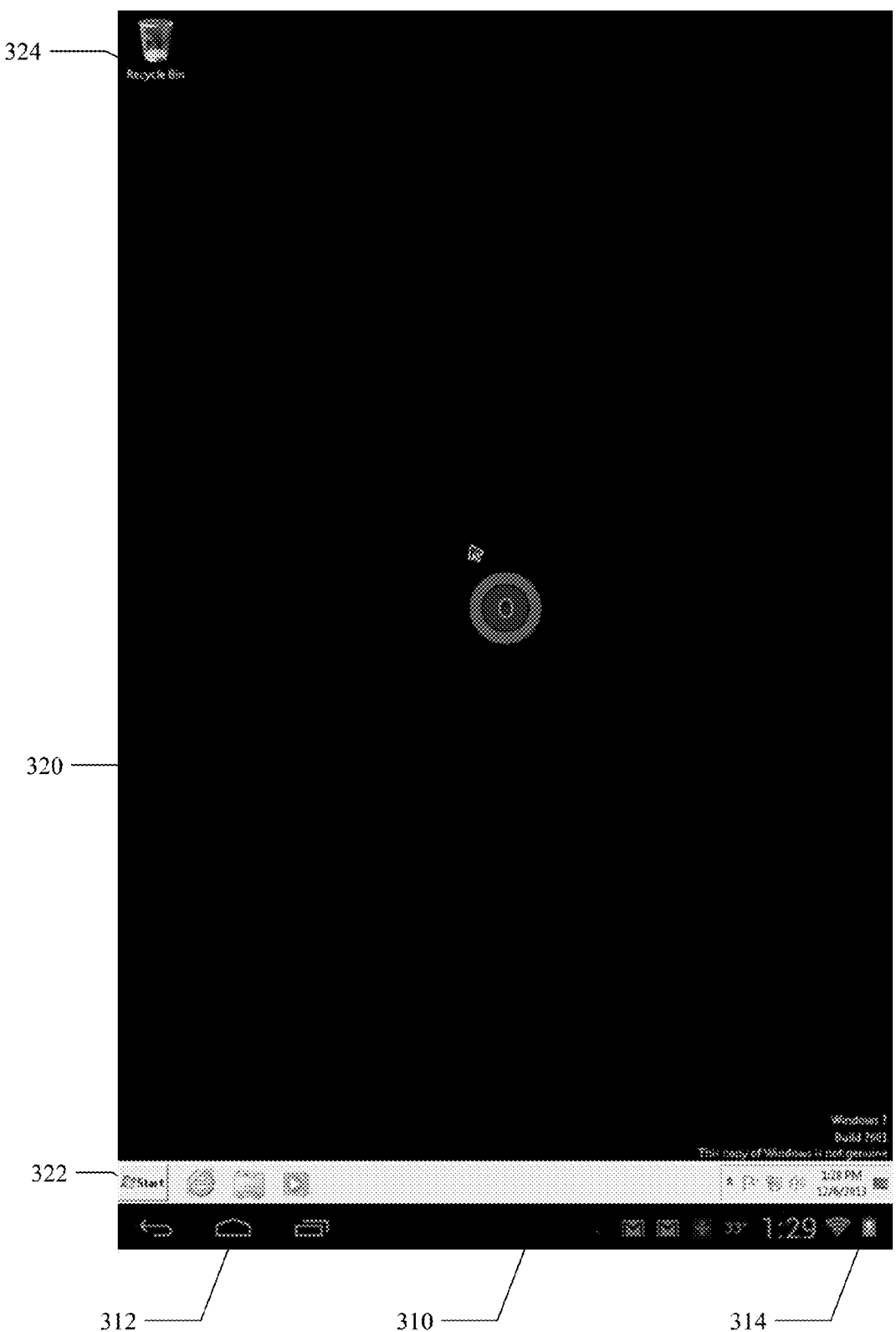
Figure 7:
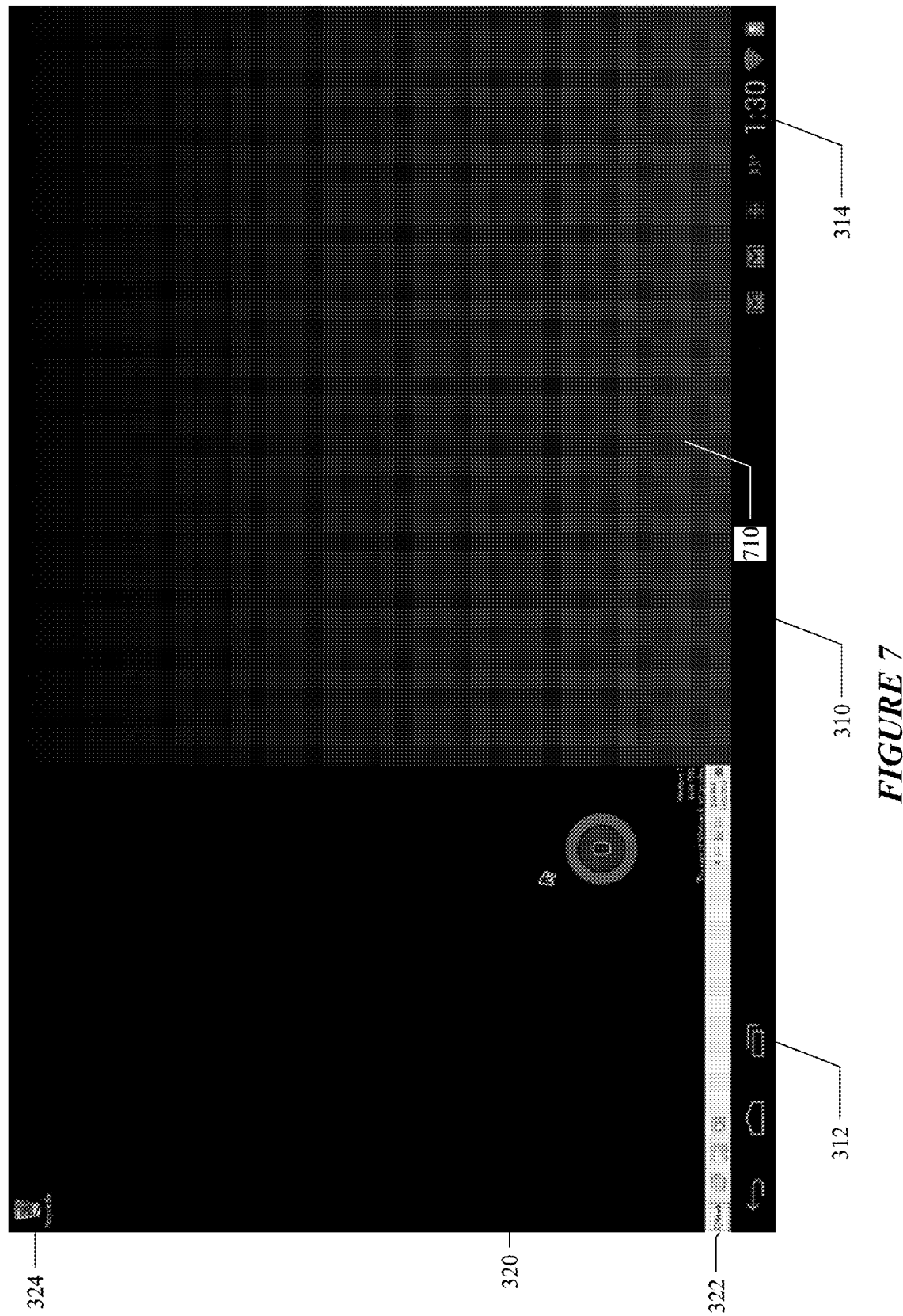

When using an RDP client application on a mobile client device, users have historically encountered a problem when changing the orientation of the mobile client device. Although the screen 310 of the mobile client device may rotate and the RDP client application interface 320 may also rotate, the rotation and reorientation of the RDP client application interface 320 may not utilize the screen space in the new orientation. Historically, the only way to have a session (e.g. a remote desktop or remote application session) be properly displayed in the new orientation would be to disconnect the session and start a new session in the new orientation, potentially causing considerable inconvenience to a user of the mobile client device. FIG. 4 illustrates an example of what may be displayed on mobile device 220 after rotating from a landscape mode (illustrated in FIG. 3) to a portrait mode. Screen 310 of the mobile client device and its associated buttons, icons, and information 312 and 314 are rotated and resized appropriately. However, RDP client application interface 320 (and its associated system taskbar 322 and desktop icons 324) now only takes up a small portion of the display of mobile client device 220, as it has been scaled or sized to fit the new orientation in the horizontal dimension. There is a large amount of unused space 410 on the display that is not utilized for displaying the RDP client application interface 320. Although it may be possible to zoom in on portions of the remote desktop displayed in the RDP client application interface 320 (thereby filling up the unused space 410), only a portion of the zoomed-in remote desktop may be displayed at one time in the new orientation. As another example, FIG. 6 illustrates an example of what may be displayed on mobile device 220 in a portrait mode. FIG. 7 illustrates an example of what may be displayed on mobile device 220 after rotating to a landscape mode from the portrait mode of FIG. 6. Screen 310 of the mobile client device and its associated buttons, icons, and information 312 and 314 are rotated and resized appropriately. However, RDP client application interface 320 (and its associated system taskbar 322 and desktop icons 324) now only takes up a small portion of the display of mobile client device 220, as it has been sized to fit the new orientation in the vertical dimension. There is a large amount of unused space 710 on the display that is not utilized for displaying the RDP client application interface 320. Although it may be possible to zoom in on portions of the remote desktop displayed in the RDP client application interface 320 (thereby filling up the unused space 710), only a portion of the zoomed-in remote desktop may be displayed at one time in the new orientation.

In particular embodiments, a remote session (e.g. a remote desktop or remote application session) may be automatically reconfigured to display in a new orientation of a mobile client device (e.g. after a rotation), without need to disconnect and reconnect the remote session. The transition from portrait to landscape mode (or vice versa) may, for example, be seamless and require no manual adjustment by the user to properly fit the display of the new orientation. In particular embodiments, a virtual channel protocol (such as, e.g., Microsoft RDP: Dynamic Virtual Channel Extension, supported by Windows 8.1 Professional Edition or Windows Server 2012 R2) may be utilized to automatically reconfigure the display of a remote session in a new orientation of a mobile client device.

Figure 5:
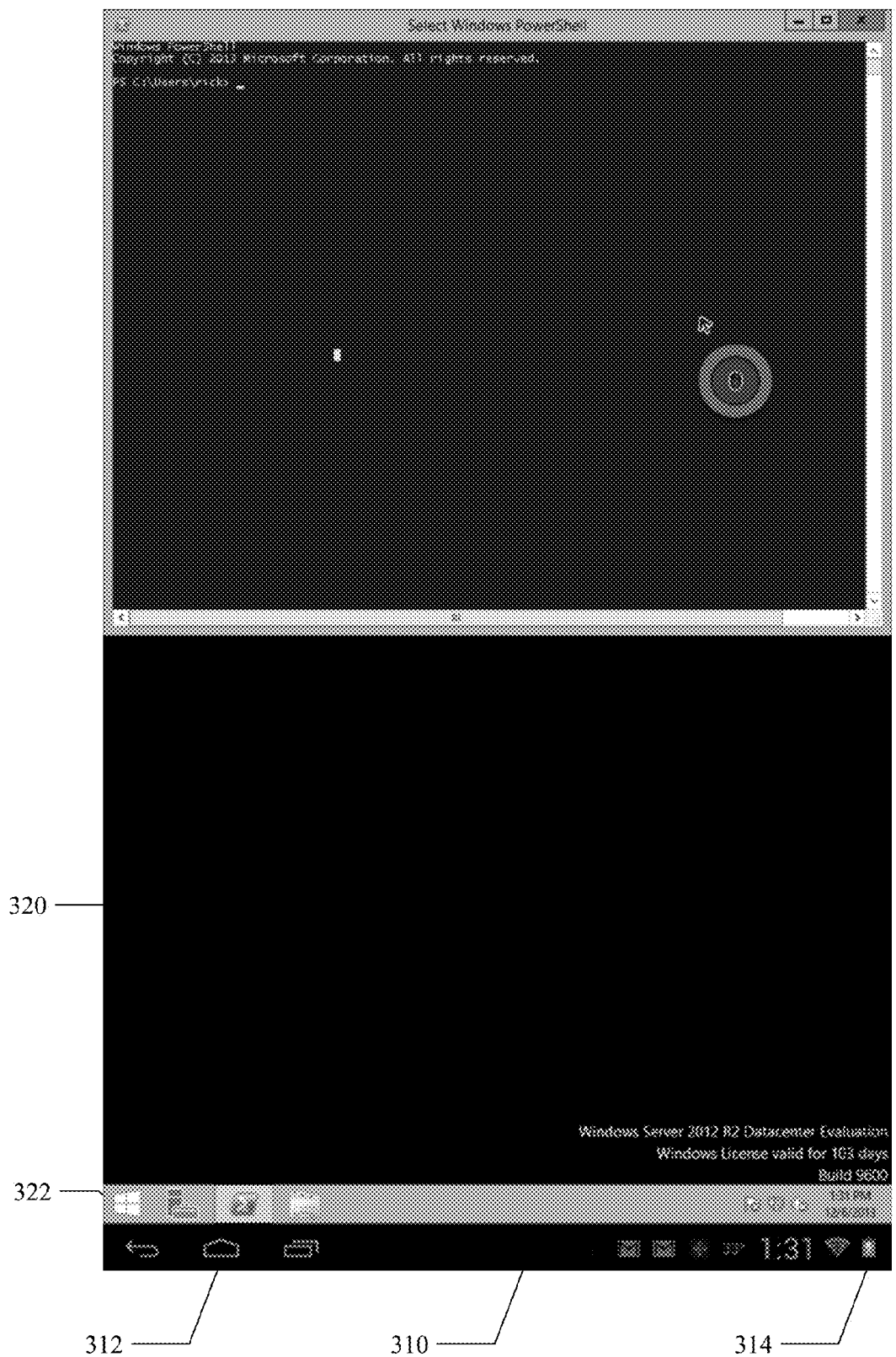
Figure 8:
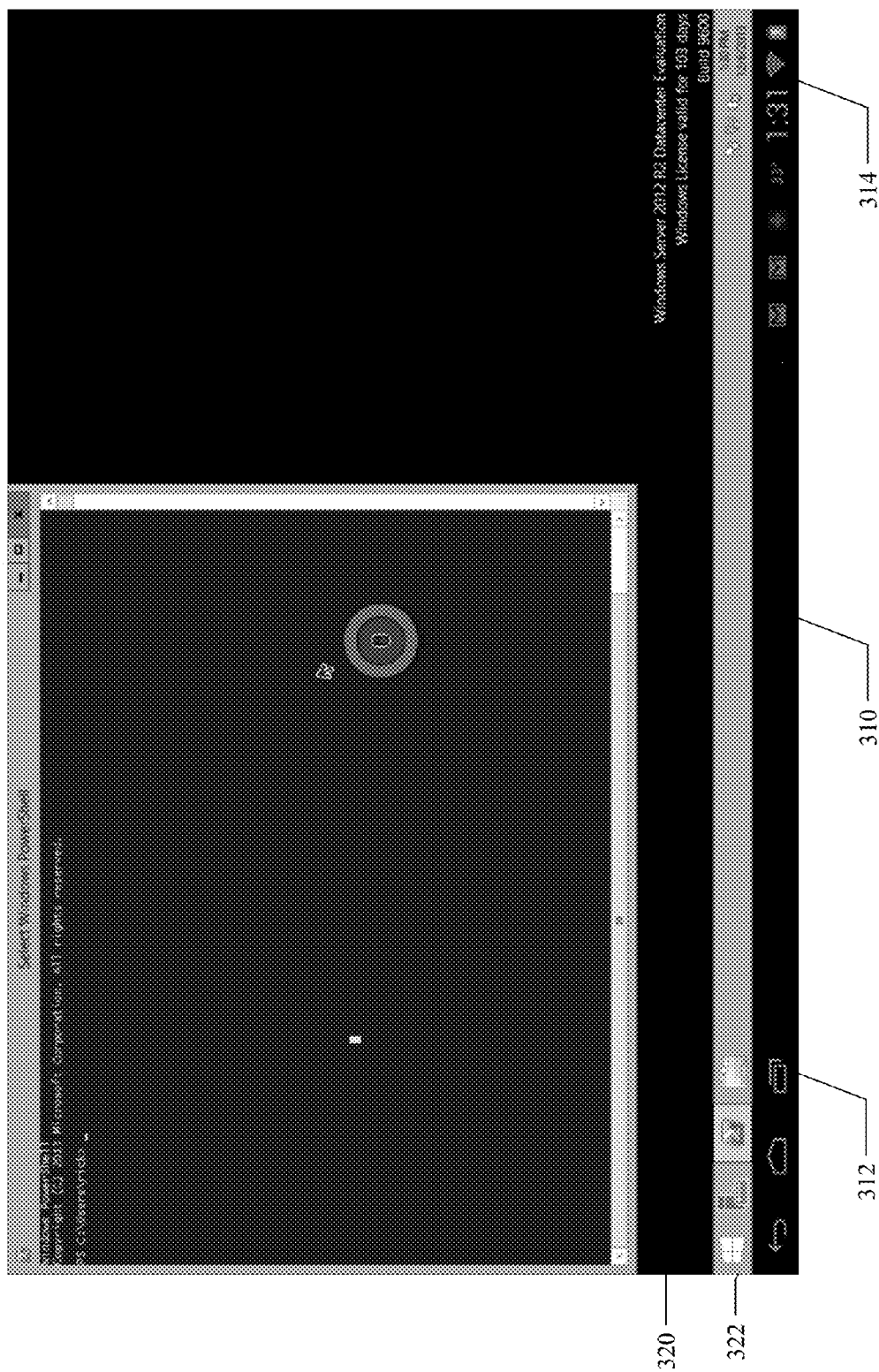

In particular embodiments, a mobile client device 220 (including, e.g., an RDP client application running on the mobile client device) creates a remote terminal session (e.g. a new remote desktop session or new remote application session) with one or more servers 240, with the current display configurations as the desired initial dimensions. The mobile client device may, for example, include a mobile device running Dell POCKETCLOUD remote desktop access software. The current display configurations may be based on current (e.g. the most recent) data gathered by one or more sensors (e.g. accelerometers, gyroscopes, or gravitometers) of the mobile client device. The initial dimensions may, for example, include a screen size (e.g. measured in pixels) associated with the current display configurations. The mobile client device then attempts to create a dynamic virtual channel for display control communications with the remote host (e.g. a server 240) of the remote desktop or remote application. If the remote host does not support dynamic virtual channel control, then the mobile client device may simply scale the remote session as previously described with respect to FIGS. 3, 4, 6, and 7. However, if the remote host does support dynamic display control, the mobile client device will establish the dynamic virtual channel with the remote host and utilize this channel to pass information to the remote host regarding every orientation change to the mobile client device. The information passed via the dynamic virtual channel may include any suitable information associated with an orientation and may, for example, include the width and height of the display associated with the current (e.g. new) orientation of the mobile client device. The information passed may also include, for example, the number of dots per inch (DPI) of the display; this information may be used by the remote host, for example, if the mobile client device and the remote desktop or remote application do not use the same number of pixels for their display output. The DPI may, for example, be different on the mobile client device than the remote desktop or remote application in order to change font smoothing or icon sizes (e.g. to scale components on the screen differently relative to one another). As another example, the information passed may include one or more coordinates associated with one or more axes of the new orientation. Once the information has been passed, the remote host will then perform as if an existing physical monitor has been disconnected and a new physical monitor (with the dimensions specified by the information passed by the mobile client device) has been attached, without disconnecting or ending the session with the mobile client device. For example, the remote host will provide remote desktop or remote application graphical data that is based on the dimensions specified by the mobile client device (e.g., specifying the location of icons or other content according to the dimensions specified). As another example, the remote host may provide remote desktop or remote application graphical data that is based on the coordinates provided by the mobile client device. The mobile client device may then accept remote desktop or remote application data from the remote host and render and display this data. FIG. 5 illustrates an example display of a mobile client device that was rotated from landscape mode (displayed in FIG. 3) to portrait mode, with the automatic resizing of the remote desktop that is displayed in RDP client application interface 320. Unlike the example of FIG. 4, there is no unutilized space 410 present in FIG. 5; the display is filled with the RDP client application interface 320 and the remote desktop that it presents. Similarly, FIG. 8 illustrates an example display of a mobile client device that was rotated from portrait mode (displayed in FIG. 6) to landscape mode, with the automatic resizing of the remote desktop that is displayed in RDP client application interface 320. Unlike the example of FIG. 7, there is no unutilized space 710 present in FIG. 8; the display is filled with the RDP client application interface 320 and the remote desktop that it presents. Each time the mobile client device is rotated or reoriented during the remote desktop or remote application session, the operating system of the mobile client device notifies its registered listeners (including, e.g., the RDP client application) of this change. The RDP client application of the mobile client device provides the most-current display configuration data to the remote host via the dynamic virtual channel. The remote host then provides remote desktop or remote application graphical data that is based on the new dimensions specified by the mobile client device. Thus, the mobile client device may be rotated, and the remote sessions (e.g. desktop or applications) displayed by the mobile client device may be reoriented and resized automatically, without need for disconnection or reconnection of the remote sessions.

In particular embodiments, a remote desktop may be displayed in one orientation on a mobile client device (e.g. landscape orientation) based on an orientation of the mobile client device, but one or more applications running on the remote desktop may be displayed in a different orientation (e.g. portrait orientation). For example, even if the mobile client device is in a landscape mode and the remote desktop is displayed in RDP client application interface 320 in a landscape mode, a portable document file (PDF) viewer application may be displayed in a portrait mode by default, as specified in one or more application settings or user preferences in the operating system of the mobile client device.

In particular embodiments, the mobile client device may receive unadjusted graphical data from the remote host (e.g. even after the mobile client device is rotated), and the mobile client device may adjust the graphical data it receives locally so that the data may display correctly in the new orientation. For example, the mobile client device may scale the graphical data received from the remote host or may transform coordinates from one coordinate space (e.g. associated with the unadjusted graphical data from the remote host) into a new coordinate space (e.g. associated with the new orientation of the rotated mobile client device).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, establishing a remote terminal session of a remote desktop connection with a remote host, wherein the remote desktop connection comprises one or more dynamic virtual channels for communicating dynamic display control communications to and from the remote host, and wherein the establishing comprises communicating with the remote host using a remote desktop protocol;
   by the computing device, receiving from one or more sensors of the computing device an indication that the computing device has been rotated to a new orientation;
   by the computing device, sending to the remote host, via one of the dynamic virtual channels, information associated with the new orientation, wherein the information comprises at least one of a) height, width and dots per square inch of a display of the computing device or b) one or more coordinates;
   by the computing device, receiving from the remote host graphical data, wherein the graphical data is based at least in part on the information associated with the new orientation;
   by the computing device, providing for display the graphical data; and
   wherein the sending the information associated with the new orientation to the remote host is implemented automatically and without disconnecting the remote terminal session and starting a new remote terminal session.

2. The method of claim 1, wherein the computing device comprises a mobile phone or a tablet computer.

3. The method of claim 1, wherein the graphical data comprises data associated with a remote desktop session for display in the new orientation.

4. The method of claim 1, wherein the graphical data comprises data associated with a remote application session for display in the new orientation.

5. The method of claim 1, wherein the sensors comprise one or more of an accelerometer, a gravitometer, or a gyroscope.

6. The method of claim 1, wherein the information associated with the new orientation comprises dimensions of a display associated with the new orientation of the computing device.

7. The method of claim 1, wherein the computing device is operable to receive graphical data from the remote host without need for disconnecting or reconnecting the remote desktop connection.

8. An information handling system comprising:
   one or more processors; and
   a memory coupled to the processors comprising instructions executable by the processors, the processors being operable when executing the instructions to:
      establish a remote terminal session of a remote desktop connection with a remote host, wherein the remote desktop connection comprises one or more dynamic virtual channels for communicating dynamic display control communications to and from the remote host, and wherein establishing a remote terminal session comprises communicating with the remote host using a remote desktop protocol;
      receive from one or more sensors an indication that the information handling system has been rotated to a new orientation;
      send to the remote host, via one of the dynamic virtual channels, information associated with the new orientation, wherein the information comprises at least one of a) height, width and dots per square inch of a display of the computing device or b) one or more coordinates, and wherein the sending the information associated with the new orientation to the remote host is implemented automatically and without disconnecting the remote terminal session and starting a new remote terminal session;

receive from the remote host graphical data, wherein the graphical data is based at least in part on the information associated with the new orientation; and provide for display the graphical data.

9. The information handling system of claim 8, wherein the information handling system comprises a mobile phone or a tablet computer.

10. The information handling system of claim 8, wherein the graphical data comprises data associated with a remote desktop session for display in the new orientation.

11. The information handling system of claim 8, wherein the graphical data comprises data associated with a remote application session for display in the new orientation.

12. The information handling system of claim 8, wherein the sensors comprise one or more of an accelerometer, a gravitometer, or a gyroscope.

13. The information handling system of claim 8, wherein the information associated with the new orientation comprises dimensions of a display associated with the new orientation of the information handling system.

14. The information handling system of claim 8, wherein the information handling system is operable to receive graphical data from the remote host without need for disconnecting or reconnecting the remote desktop connection.

15. One or more computer-readable non-transitory storage media embodying software that is operable when executed to:

establish a remote terminal session of a remote desktop connection with a remote host, wherein the remote desktop connection comprises one or more dynamic virtual channels for communicating dynamic display control communications to and from the remote host, and wherein the establishing comprises communicating with the remote host using a remote desktop protocol;

receive from one or more sensors of a computing device an indication that the computing device has been rotated to a new orientation;

send to the remote host, via one of the dynamic virtual channels, information associated with the new orientation, wherein the information comprises at least one of a) height, width and dots per square inch of a display of the computing device or b) one or more coordinates, and wherein the sending the information associated with the new orientation to the remote host is implemented automatically and without disconnecting the remote terminal session and starting a new remote terminal session;

receive from the remote host graphical data, wherein the graphical data is based at least in part on the information associated with the new orientation; and provide for display the graphical data.

16. The media of claim 15, wherein the computing device comprises a mobile phone or a tablet computer.

17. The media of claim 15, wherein the graphical data comprises data associated with a remote desktop session for display in the new orientation.

18. The media of claim 15, wherein the graphical data comprises data associated with a remote application session for display in the new orientation.

19. The media of claim 15, wherein the sensors comprise one or more of an accelerometer, a gravitometer, or a gyroscope.

20. The media of claim 15, wherein the information associated with the new orientation comprises dimensions of a display associated with the new orientation of the computing device.

* * * * *